United States Patent [19] [11] 3,993,730
Cooper [45] Nov. 23, 1976

[54] PURIFICATION OF COKE OVEN GAS WITH PRODUCTION OF SULFURIC ACID AND AMMONIUM SULFATE

[76] Inventor: Franklin D. Cooper, 1200 N. Queen St., Arlington, Va. 22209

[22] Filed: Jan. 30, 1976

[21] Appl. No.: 653,815

[52] U.S. Cl. .............................. 423/225; 423/234; 423/236; 423/238; 423/242; 423/143; 423/144; 423/150; 423/523; 423/550; 423/632; 134/3; 134/10
[51] Int. Cl.² .................. C01C 1/242; C01B 17/76; C23G 1/08; C01C 3/04
[58] Field of Search ........... 423/225, 234, 236, 237, 423/238, 242, 523, 531, 550, 632, 143, 144, 150; 134/3, 10

[56] References Cited
UNITED STATES PATENTS

| | | | |
|---|---|---|---|
| 961,763 | 6/1910 | Falding | 423/236 |
| 1,315,219 | 9/1919 | Espenhahn | 423/236 |
| 1,375,476 | 4/1921 | Van Ackeren | 423/550 |
| 1,931,408 | 10/1933 | Hodsman et al. | 423/242 |
| 2,021,548 | 11/1935 | Goodeve | 423/242 |
| 2,169,282 | 8/1939 | Pieters | 423/236 |
| 2,443,765 | 6/1948 | Francis | 423/550 |
| 2,511,306 | 6/1950 | Tiddy | 423/550 |
| 2,511,307 | 6/1950 | Tiddy et al. | 423/550 |
| 2,880,061 | 3/1959 | Muns | 423/550 |
| 2,943,911 | 7/1960 | Sweeney | 423/550 |

Primary Examiner—Earl C. Thomas
Assistant Examiner—Brian E. Hearn
Attorney, Agent, or Firm—William S. Brown; Donald R. Fraser

[57] ABSTRACT

A continuous process is provided which has the primary purpose of removing $NH_3$, $H_2S$, HCN, and $(CN)_2$ from the subject gas mixtures and the secondary purpose of producing $(NH_4)_2SO_4$ and iron oxide for industrial uses. The gas mixture which contains tar and other condensible vapors, $NH_3$, $H_2S$, HCN, and $(CN)_2$ together with small volumes of gas from the ammonia still of the system, and gas from a system $H_2SO_4$ plant, is contacted in a single three-stage reaction chamber in the presence, if need be, of a tar solvent, additional $NH_3$, and the reagent $Fe(OH)_2$, which itself is a product of a concurrent reaction between $NH_3$ and $FeSO_4$. The unpurified gas mixture's condensible vapors are largely prevented from condensing by maintaining a steady, elevated temperature, while the mixture is essentially freed of HCN, $(CN)_2$, $NH_3$, and $H_2S$ in the reactor before the gas mixture passes through a primary gas cooler. The gas then passes through a benzene, toluene, and xylene absorber before being pressurized and distributed. The spent reaction chamber reagent is separated to produce tar and solvent; $(NH_4)_2SO_4$, solution, and iron precipitates. Sulfur dioxide released by the iron oxide production process is used to produce $H_2SO_4$, which in turn is either reacted with scrap iron, or used in a metal pickling operation to produce $FeSO_4$ for use in preparation of the reaction chamber reagent.

11 Claims, 1 Drawing Figure

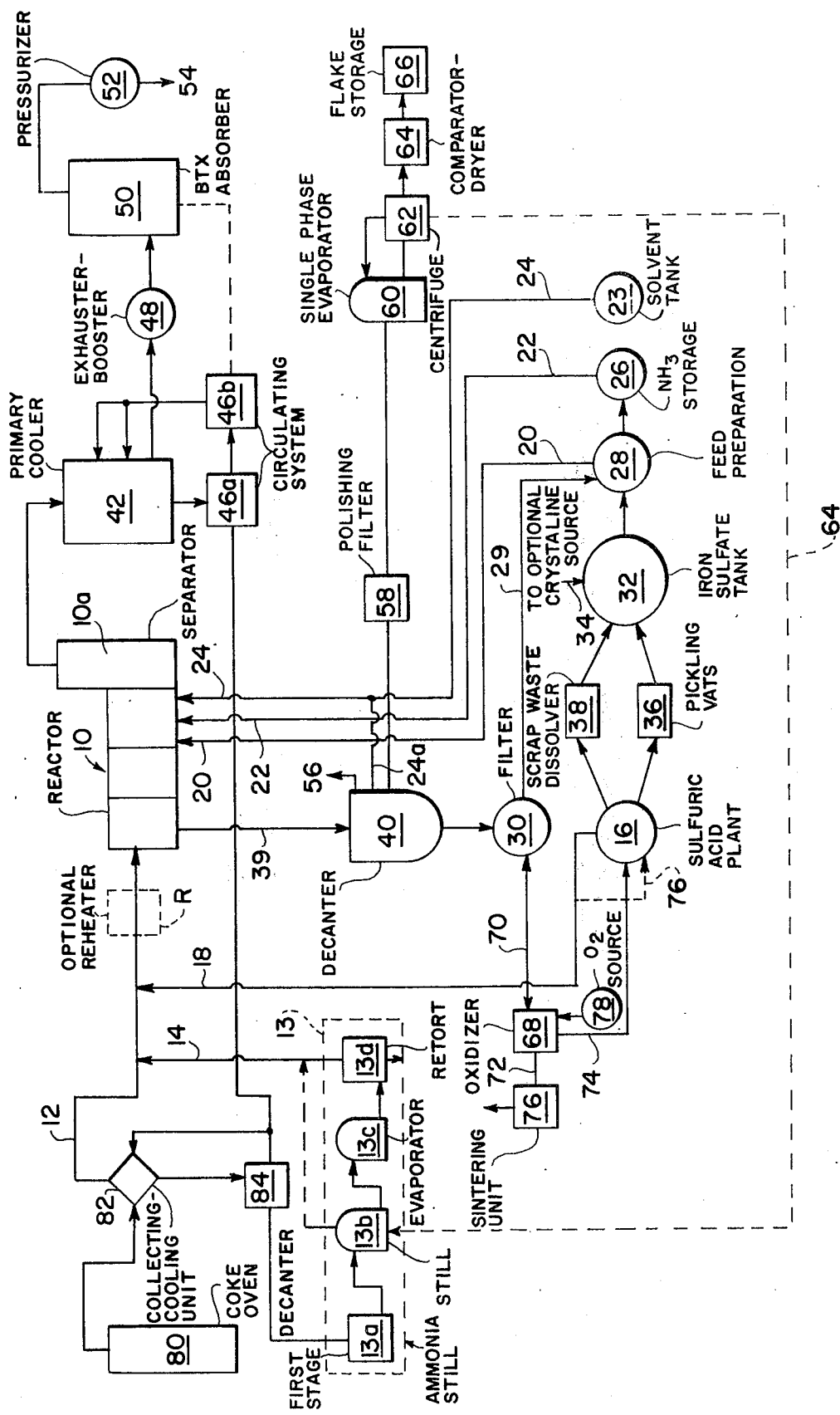

PURIFICATION OF COKE OVEN GAS WITH PRODUCTION OF SULFURIC ACID AND AMMONIUM SULFATE

FIELD OF THE INVENTION

The present invention relates to a method of processing gases from the thermal decomposition of carbonaceous matter, and more particularly, to a method for processing coke oven gas to essentially free it from noxious compounds such as $H_2S$, HCN, and $(CN)_2$.

BACKGROUND OF THE INVENTION

The use of Fe $(OH)_2$ in scrubbing coke oven gas to remove the impurities therefrom is disclosed, for example, in U.S. Pat. Nos. 961,763 (Falding) and 3,021,189 (Mancke), the $Fe(OH)_2$ being a product of a reaction between $FeSO_4$, $NH_3$, and water. The processes disclosed in the Falding and Mancke et al patents produce a gas which is relatively clean (the gas leaving the reactor in the Mancke system is said to contain 5 grains of ammonia per 100 cu. feet 60 grains hydrogen sulfide per 100 cu. feet, and 10 grains of hydrogen cyanide per 100 cu. feet). It is noted that the Falding patent refers to the recovery of "values" from the process disclosed therein and specific reference is made to the recovery of ammonium and iron salts.

With the increasing demand for cleaner coke oven gas and an increasing emphasis on abatement and control of process-related pollution, the processes disclosed in the patents referred to are not satisfactory from all standpoints. For example, residual amounts of hydrogen cyanide and hydrogen sulfide still remain in the fuel gas and these, and other impurities, tend to corrode the plant equipment and cause pollution when the gas is utilized. In addition, the production of the reagents used, the scrubbing of the fuel gas, and the production of marketable by-products are all themselves sources of environmental pollution. Further, prior art processes are, in general, incompatible with, that is, do not accept, tar-laden coke-oven gas. Finally, and more generally, prior art processes require multiple gas washing equipment, complex gas handling procedures having high energy requirements, and, as alluded to above, are highly subject to the corrosive influences of the impurities that these processes are designed to remove. However, the features and advantages of the process of the present invention can perhaps be best appreciated by specifically considering these features and advantages.

SUMMARY OF THE INVENTION

In accordance with the invention, a process for the purification of coke oven gas is provided which produces cleaner gas than processes employed heretofore. The cleaner gas prevents corrosion of the primary gas cooler and other equipment in the gas handling system, and the product gas burns cleaner. According to one important aspect of this particular feature of the invention, the operating temperature in the reactor is maintained in the 78° C to 80° C range whereas current practice at coke plants involve the cooling of gases to temperatures ranging from 46° C to 28° C. The relatively high temperature of the process of the invention speeds the reactions in the reactor and improves the physical properties of the precipitated iron compounds, thereby speeding the decantation and filtration operations. The process of the invention also practically eliminates the subliming of naphthalene and the condensation of tar vapors. Further, the process of the invention is estimated to require 20% to 40% less energy than is required to perform similar gas handling in conventional plants.

While processes such as disclosed in the Falding patent referred to above preferably use a detarred gas, with the attendant cooling and intricate handling steps required before the gas is processed in the scrubber, the process of the invention does not demand either partially or completely detarred gasses because the process is intended to take place at the same temperature as that of the incoming gases and vapors.

The process of the invention is readily adaptable to existing plants. The slurry reactor is advantageously located between the gas collection main, positioned above the carbonization chambers, and the inlet of the existing primary gas cooler of the plant. Such a location makes feasible the processing of gas at temperatures ranging from 78° C to 80° C. In conventional carbonization plants, ammonia is normally incompletely removed from the gases after their passage through the primary gas cooler. The procedure leaves varying amounts of $NH_3$, $H_2S$, $(CN)_2$, and HCN in the gases, thereby causing corrosion and other problems as referred to hereinabove.

The process produces, in a clean manner, some of the reagents used in the process, such as $NH_3$ (although and outside source of additional ammonia is usually required), $H_1SO_4$, $FeSO_4$, and Fe $(OH)_2$. This invention salvages all of the sulfur values and prevents pollution by the final gas cooler condensate, while eliminating costly corrosion and sludging problems associated with conventional carbonization plants.

While the process of the invention is directed to the thorough up-grading of the fuel gas, marketable by-products such as iron oxides are produced. In addition, the volume of the liquid feed to the fixed ammonia still is reduced as is the amount of caustic soda required to dephenolize the liquid feed to the fixed ammonia still.

According to a preferred embodiment thereof, the process of the invention includes cooling the coke oven gas to a temperature in the approximate range of 78° C and 180° C and producing a product $NH_3$ from the condensate. The cooled gas is then passed to a slurry reactor together with waste gases produced during the production of the product ammonia. The reactor is used to scrub the coke oven gas using a slurry reagent containing $Fe(OH)_2$ and $FeSO_4$, which react with the impurities $NH_3$, $H_2S$, HCN, and $(CN)_2$ contained in the gas. The scrubbed coke gas is then treated further to remove traces of residual impurities in a primary gas cooler before the gas passed through a benzene-toluene-xylene (BTX) absorber. The final stage gas is then pressurized for distribution.

The spent slurry reagent is separated into a tar-and-solvent product, $(NH_4)_2SO_4$ solution, and a slurry containing iron precipitates. The iron precipitates are oxidized following filtration and washing and the product off gases are fed to a dual-contact acid plant to produce $H_2SO_4$ and a minor and normal amount of unabsorbed $SO_2$ that is returned to the reactor. The $H_2SO_4$ is either reacted with scrap iron or is used in a metal pickling operation to produce $FeSO_4$. This $FeSO_4$ in aqueous solution is eventually fed back to the reactor, together with additional $NH_3$ from an external source.

Other features and advantages of the invention are set forth in, or will be apparent from, the detailed description of preferred embodiments found hereinbelow.

BRIEF DESCRIPTION OF THE DRAWINGS

The single figure in the drawings is a schematic diagram, in block form, of a coke oven gas processing system incorporating the process of the invention.

DESCRIPTION OF THE PREFERRED EMBODIMENTS

The process of the invention can be best understood by considering the system shown in the drawings. The central unit or focus point of the system is a single three-stage gas slurry reactor 10. The principal input to reactor 10 is the impure fuel gas, containing tar vapors, $NH_3$, $H_2S$, HCN, and $(CN)_2$ which is fed to the reactor 10 through line 12. The reactor 10 also receives vapors from a fixed-ammonia still 13 through line 14, and gaseous emissions from a dual contact sulfuric acid plant 16 by way of a line 18. All of these inputs enter the reactor 10 at a temperature substantially the same as the reactor temperature so as to prevent shock chilling and the formation of more than the inevitable small amounts of condensed creosote-type tars and sublimed naphthalene in the reactor 10. Optionally, more precise temperature control may be effected by an indirect reheat source, indicated by dashed line block R, to the extent to 2° to 3° C during the infrequent situations when, for example, an idle coke-oven battery is being restored to operation, or when the availability of the unpurified gas is drastically curtailed.

Also entering the reactor 10, separately through lines 20 and 22, are a $FeSO_4$-containing reagent slurry and purchased ammonia. Again, these reagents enter the reactor at a temperature which is substantially the same as the reactor temperature and are optionally heated to provide more precise temperature control. An optional neutral, high boiling, coal-tar-based, naphthalene-free solvent is supplied from a tank 23 through a line 24 to absorb small amounts of condensed creosote-type naphthalene-saturated tar and to dissolve solid naphthalene that may form despite the introduction of the feed solution or feed slurry at a temperature substantially the same as that of the unpurified inlet gas and the gas-slurry reactor 10.

The purchased ammonia is stored in tank 26. The gasslurry reagent comes from a feed preparation tank 28 which receives a series of inputs. These inputs include filtrate and filter cake wash water, which consists largely of $(NH_4)_2SO_4$ in solution from a filter 20, and iron sulfate from tank 32. Tank 32 itself is supplied (1) from an optional crystalline copperas source, indicated by arrow 34, and (2) from the treatment of iron with sulfuric acid, either by way of cleaning steel in pickling vats indicated at 36, or by way of dissolving ferrous scrap waste in an appropriate unit 38. The presence of ferric sulfate in stock solution tank 37 is not detrimental to the operation of the gas slurry reactor 10 or its products, but its presence can be minimized by the introduction of gaseous emissions from the dual-contact sulfuric acid plant 16 into the stock ferrous sulfate solution in tank 32. The presence of small amounts of extraneous metals in the ferrous sulfate sources such as aluminum, copper, chromium, manganese, and molybdenum is not detrimental to the quality of either the ammonium sulfate, which is recovered as described above, or the iron oxides, which are recovered as is also described below. In the gas slurry reactor 10, the aluminum and chromium are precipitated as hydroxides, while the copper, manganese, and molybdenum are precipitated as sulfides.

Although the drawings only provide a schematic representation thereof, the gas-slurry reactor 10 itself comprises at least three contiguous, insulated compartments as is generally indicated. The reacot 10 includes externally operated adjustable weirs (not shown) for regulating slurry depth, staggered rows of impeller-type scoops (not shown) for agitating the slurry and preventing the settling of solids therefrom, and a droplet-separator, indicated at 10a, which frees the gas stream of liquids by reversing the gas travel direction by returning the liquids thus expelled by gravity through a submerged conduit (not shown) behaving as a gas-tight seal. Each of the insulated compartments of reactor 10 has suitably positioned ingress and egress ports (not shown) for the gas and liquid streams. The plurality of ports allows the bypassing of an individual compartment for examination, repair, or maintenance, and also allows for more precise control of the entering reactants. One of the externally operated adjustable weirs referred to above, is an auxiliary weir providing about 10% of the total weir length. The weirs provide gravity flow of the slurry through the reactor compartments countercurrent to the gas flow, and preferably discharge the slurry from the compartment in first contact with the unpurified gas through an inverted outlet seal (not shown) and closed conduit 39 to a covered, insulated, baffled decanter 40, the output of which, as indicated, forms one input to filter 30. Alternatively, each compartment may directly discharge all or part of its slurry content into the decanter 40. The staggered rows of impeller-type scoops mentioned above are affixed to the same revolving horizontal shaft (not shown) which is powered by an externally positioned variable speed drive (not shown). In operation, the lower half of the shaft and one-half of the total number of scoops are submerged in the slurry. As a result, the slurry is thrown perpendicularly and upwardly through the mean axis of the gas stream against the drippoint supporting cycloidal top of the compartment.

The fuel gas impurities $NH_3$, $H_2S$, HCN, and $(CN)_2$ react in reaction chamber 10 with the slurry reagent $Fe(OH)_2$ to produce iron compounds, and ammonium sulfate. The slurry reagent $Fe(OH)_2$ exists in the feed preparation tank 32 and is also produced in the gas-slurry reactor 10 by the reaction of $NH_3$ and $FeSO_4$. The trace amounts of $NH_3$ and $H_2S$ remaining in the outlet gas stream are removed later when the scrubbed fuel gas passes through a primary cooler 42 described below. The product insoluble iron compounds mainly comprises FeS, $(NH_4)_2(CN)_6$, complex iron-cyanogen compounds analogous to Prussian and Turnbull blues, and, when the unpurified gas contains more than two volume percent oxygen, or when the reagent feed contains substantial ferric iron, ferric hydroxide, and elemental sulfur. The absence of HCN or $(CN)_2$ in the exit gas stream assures that no ammonium thiocyanate is formed later in the process.

The reactions in the single stage slurry reactor 10 are essentially complete, instantaneous, simultaneous, and irreversible. The contaminants form insoluble compounds because of the temperature of about 80° C, the high $(NH_4)_2SO_4$ content of the liquid reagent, and the avidity of the ferrous iron when reacting with the contaminants. The $(NH_4)_2SO_4$ comes from both the filtrate from filter, 30, and the production of $Fe(OH)_2$ from NH₃ and FeSO₄ in the reactor 10. Further, the transfer of contaminants from the fuel gas to the liquid reagent is aided by the turbulent agitation of the reagent, the high velocity and greater mass of the gas stream due to its high water content, and the effect of temperature in decreasing both the viscosity and thickness of the liquid film No soluble ammonium ferrocyanide $(NH_4)Fe(CN)_6$ is produced in the gasslurry reactor 10 because of the high operating temperature, the low content of unreacted free ammonia, and the presence of unreacted ferrous iron in the liquid reagent. Also, essentially no H₂S is liberated to recontaminate the purified gas leaving slurryreactor 10 because, at the relatively high reactor temperatures the reaction: $6HCN + 2NH_3 + 2Fe(OH)_2 = (NH_4)_2Fe_2(CN)_6 + 2H_2O$ occurs, rather than the very slow reaction:

$$6HCN + 2NH_3 + 2FeS = (NH_4)_2Fe_2(CN)_6 + 2H_2S$$

The spent liquid reagent withdrawn from the reactor 10 through conduit 39 preferably contains no more than 1.0 gram per liter (gpl) of unreacted ferrous iron to assure optimal removal of contaminants from the fuel gas. The soluble iron concentration is monitored by a flow colorimeter (not shown) and the auxiliary weir discussed above is adjusted so as to increase flow from the reactor 10 to the decanter 40 when the soluble iron content is less than 1.0 gpl, and to decrease flow from the reactor 10 to the decanter 20 when the soluble iron content is greater than 1.0 gpl. The accuracy of the flow colorimeter can readily be spot checked by accepted qualitative tests made on the clean solution filtered from the spent reagent. It is noted that a pH adjustment is precluded as another means for controlling the unreacted ferrous iron content of the spend liquid reagent liquid reagent because of the high operating temperature, and because of the pH-buffering behavior of the high concentration of the $(NH_4)_2SO_4$. The unreacted ferrous iron is precipitated as FeS by the introduction of a significantly small input of H₂S into the spent reagent as it moves through the first pass (not shown) of the baffled decanter 40. This addition of H₂S is preferably controlled by an automatic system (not shown) incorporating a hydrogen sulfide detector (not shown).

The gases and vapors in line 14 from the fixed-ammonium still 13 referred to above, and the gaseous emissions in line 18 from the contact sulfuric acid plant 16 can be introduced into the unpurified gas stream in line 12 without detrimental effects on either the operation of the gas-slurry reactor 10, or the quality of the commercial products e.g., $(NH_4)_2SO_4$, iron oxides and H₂SO₄, obtained in the subsequent processes described below. The sulfur dioxide and oxygen contained in the gaseous emissions line 18 from the sulfuric acid plant 16 will, on first contact with the liquid reagent in the gas-slurry reactor 10, produce $(NH_4)_2SO_4$ by way of this simplified illustrative reaction:

$$2NH_3 + SO_2 + H_2O + FeSO_4 = FeSO_3 + (NH_4)_2SO_4$$
$$FeSO_3 + 1/2 O_2 = FeSO_4$$
$$FeSO_4 + 2NH_3 + 2H_2O = (NH_4)_2SO_4 + Fe(OH)_2$$
$$Fe(OH)_2 + H_2S = FeS + 2H_2O$$

The formation of more than trace amounts of $Fe(OH)_3$ and $FeCO_3$ by oxidation and carbonation of the $Fe(OH)_2$ present in the reactor operation is prevented because of the 78° to 80° C temperature maintained, and its depressing effect on the solubility of oxygen and carbon dioxide.

The fuel gas, having been freed of all impurities except for trace amounts of NH₃ and H₂S, then goes to the conventional primary gas cooler 42, where the remaining NH₃ and H₂S are absorbed, and any remaining tar or naphthalene is condensed or sublimed. The fuel gas then passes through an exhauster-booster 48 into the BTX absorber 50 where benzene, toluene, xylene are removed. The fuel gas is then pressurized in 54 before distribution.

The cooled aqueous condensate in the output line 44 from cooler 42 is added to a flushing liquor circulating system comprising units 46a and 46b, and may be dephenolized by contact with a crude BTX (benzene-toluene-xylene) mixture.

The spent reagent discharged from the slurry reactor 10 passes to the insulated baffled decanter 40 where it is separated by gravity into three phases. The top liquid layer comprises a small volume of 1.06 – 1/12 actual specific gravity, highly fluid naphthalene-saturated creosote-type coal tar which is available at outlet 56, or a solution of such tar dissolved in high boiling coal-tar based neutral solvents which may be optionally added to the slurry above. The liquid layer is periodically withdrawn from the decanter 40 through outlet 56, and is processed to produce tar-based materials including neutral solvent that can be recycled to the gas slurry reactor 10.

The intermediate liquid layer comprises a 2.5-pound per gallon, 1.15 specific gravity solution of $(NH_4)_2SO_4$ free of soluble ferrous iron. This layer is withdrawn from decanter 40 at a steady rate and may be brought to a sparkling condition by passage through the optional polishing filter 58, it being noted that such clarification of the solution is unnecessary in the production of low value commercial grade $(NH_4)_2SO_4$. This liquid is then introduced into a single-effect evaporator 60, where much of the water is removed, and is then introduced into a centrifuge 62. As indicated by dashed line 64, the mother liquor from centrifuge 62 can be sent to the fixed ammonia still 3 to mitigate impurity buildup. Water vapor from evaporator 60 is condensed in the barometer leg of the evaporator, and will not pollute when discharged. The centrifuged wet crystals from centrifuge 62 are passed through a compactor-dryer 64 where additional mother liquor is incompletely expelled, and the resultant flakes are heated principally by the heat of compression. The strength of the flakes is increased during their retention and slow cooling in a storage location 66 by the formation of additional intersititial crystals. The overall recovery of commercial grade $(NH_4)_2SO_4$ equals more than 98 percent of the total SO₄ equivalent of the H₂S removed from the unpurified gas plus the SO₄ present in sources not indigenous to the system.

The bottom layer in the decanter 40 comprises a mixture of 1.15 specific gravity $(NH_4)_2SO_4$ solution and precipitated iron compounds, principally FeS. The apparent medium particle density of the precipitated iron compounds ranges from 4.2 to 4.5. The FeS, and the presence of high concentration of $(NH_4)_2SO_4$ in this phase of the spent slurry, coagulates and occludes the smaller amounts of other precipitated iron compounds. Filter 30, which was referred to above, is a conventional rotary vacuum filter that serves to separate the ammonium sulfate solution from the precipitated iron compounds. The resulting filter cake is then freed of $(NH_4)_2SO_4$ by two fresh water washings, removed from the filter medium by mechanical, rather than pneumatic, means, and then dried out of contact with air to prevent spontaneous oxidation. The filter cake washings are returned through line 29 to the feed reagent preparation tank 28 as indicated hereinabove. The heat for drying under reduced pressure may be supplied by low-pressure steam or hot water discharged from the cooling jackets of a two-stage dried filter cake oxidizer 68 through line 70.

The dried-washed insoluble iron compounds supplied from filter 30 are converted by oxidation in the two stage oxidizer 68 into low-sulfur content iron oxides, such as $Fe_2O_3$, which appear as line 72 and gases which appear as line 74. Principally, these gases comprise $SO_2$ and $O_2$, minor amounts of $CO_2$, $H_2O$, and $N_2$, and inevitable trace amounts of $SO_3$, and $NO_x$ produced by the following reactions:

$4FeS + 7O_2 = 2Fe_2O_3 + 4SO_4$
$(NH_4)_2Fe_2(CN)_6 + 9.5O_2 = Fe_2O_3 + 4N_2 + 4H_2O + 6CO_2$
$(NH_4)_2SO_4 + O_2 + N_2 + 4H_2O\ SO_2$
$NO_2 + O_2 = NO_4$

The latter two reactions are virtually nonexistent. The finely divided iron oxide product shown as line 72 may be sintered and agglomerated in admixture with other material customarily so processed in steel plants using conventional sintering and agglomerating equipment indicated at 76. The iron oxide product from line 72 may also be injected into a blast furnace through tuyeres (not shown) or used in the production of ferrocoke, special cements, and abrasives. The oxidizer product gas in line 74 is optionally treated to remove dust, and then sent to the dual contact acid plant 16 along with an optional amount of recycled and plant emission from line 18, as indicated by dashed line 76. The iron oxide dust recovered from the optional treatment of the hot gas is certain to contain some adsorbed $SO_3$, and should be recycled either by mixing with the thickened slurry feed to filter 30, or by adding to the gas-slurry reactor reagent-feed preparation tank 32 as indicated.

Although the construction of the oxidizer 68 is not illustrated, several features thereof are of interest. The dried filter cake from filter 30 is introduced into the top section of the oxidizer 68 using a star feeder (not shown) to prevent the leakage of gases at 15.5 psia pressure. The solids feed falls only several inches onto the sloped top surface of a porous refractory-oxide mantle (not shown) that is supported by, but insulated from, the tops of the cooling jacket sections. The uncooled mantle improves the distribution of oxygen to the top section of the oxidizer 68 and serves as an igniter for initiating the partial oxidation of the solids feed.

In the top section of the oxidizer 68, the solids, in repeated contact with the fluted conical surface provided by the centrally positioned cooling jacket sections referred to above, move downward as a restricted-slide and nonrolling layer. This type of movement minimizes the dust loading in the gases evolved from the top section, increases the heat transfer from the partially oxidized solids to the cooling jacket sections, and assures thorough contact of gases and solids. In steady-state operation, gases only will contact the surface of the cooling jacket sections lining the inner face of the outer shell of the top section of oxidizer 68. In the top section, despite the intentionally restricted input of oxygen, the decomposition and oxidation of the small amounts of $(NH_4)_2Fe_2(CN)_6$ and $(NH_4)_2SO_4$ in the feed solids is essentially complete due to the presence of heat liberated by the oxidation of a portion of the FeS contained in the feed solids. The velocities of both the solids and gases in the top section decrease as these components move downward through the increasing annular volume. The incompletely oxidized solids move from the maximum annular volume in the top section into the contiguous maximum annular volume provided by the bottom section of the oxidizer 68.

Gases evolved from the top and bottom sections of oxidizer 68 attain their lowest velocity in these contiguous maximum annular volumes. The mixed gases, containing a maximum dust content of two grains per actual cubic foot, leave the oxidizer 68 through several common outlets (not shown). The contiguous maximum annular volumes also increase the retention time of gases and solids at a maximum beneficial temperature in the greater width of the solid bed (not shown) between the bounding cooling jackets.

In the bottom section of the oxidizer 68, the annular volume referred to above is filled with discrete, finely divided solids (not shown). The permeability to gas flow through the solids results from the shearing and nonpacking phenomenum produced when discrete particles move downward at varying velocities. As the particles move downward, the permeability of the solids bed is unaffected despite the decreasing annular volume. Both the velocities of the particles and the upward flowing input of oxygen increase while the retention time of the solid and gas phase decrease.

All particles are completely oxidized by the excess oxygen present at the time the particles moving downward through the decreasing annular area of the bottom section have traveled through a distance equal to about two thirds the overall height of the said section. Thereafter, the final iron oxide continues to be cooled by contact with the boundary cooling jackets and the total oxygen input to the bottom section of the oxidizer 68. The iron oxide at approximately 400° F is discharged by gravity into an enclosure, containing the oxygen inlet and star feeder, which is capable of preventing oxygen leakage at a pressure of 15.5 psia while discharging the iron oxide.

Oxygen input through the enclosure referred to is sufficient to (1) complete the conversion of solids passing through the bottom section into iron oxide essentially free of sulfur and to (2) furnish the stoichiometric requirement for the oxidation of all the $SO_2$ leaving the oxidizer 68 to $SO_3$ in a dual-contact acid plant.

The oxidizer 68 produces negligible amounts of $NO_x$, $SO_3$, and high-sulfur iron oxide "clinkers." No $NO_x$ is formed because the oxidizer 68 operates with the gas phase at essentially atmospheric pressure, and with a low content of nitrogen in contact with iron oxide particles intentionally maintained at 800° C maximum temperature by the fluted solids cooling jackets. The temperature control also prevents both substantial oxidation of $SO_2$ to $SO_3$ in the presence of $Fe_2O_3$ and sufficient oxygen introduced from an $O_2$ source 78 to the bottom section of the oxidizer 68 for the complete oxidation of $SO_2$. Temperature control also prevents the formation of high-sulfur iron oxide clinkers in the top section of the oxidizer 68, to which the input of oxygen is intentionally maintained at a rate insufficient to attain complete oxidation of the dried filter cake feed.

The oxidizer 68 also prevents a high dust content in the hot gas in line 74 because the contiguous maximum annular volume results in a minimal velocity of the hot gases evolved from the top and bottom sections, and a maximum dust loading of 0.5 grain per actual cubic foot. Hence, the use of electrostatic equipment for cleaning low dewpoint hot gases from line 74 containing the iron oxide dust is feasible because the gas volume is relatively small, and the hot iron oxide dust has a favorable electrical resistance because of the absence of more than traces of absorbed $SO_3$ and water of hydration.

The gases in line 74, which mainly comprise $SO_2$ and $O_2$, minor amounts of $CO_2$, $H_2O$, and $N_2$, and inevitable trace amounts of $SO_3$ and $NO_x$, feed into the dual-contact acid plant 16 with a volumetric content of $SO_2$ three to six times greater than customary. Consequently, the gas in line 74 may be diluted by the addition of most of the gaseous emission of plant 16. Further, all of the equipment of the acid plant 16, except the dual contact $SO_2$ converter (not shown) can be smaller in dimension than the equipment used in conventional acid plants rated at the same acid-producing capacity. The normally-sized, dual-contact, three-pass $SO_2$ converter referred to permits the handling of feed gas containing 9 to 13 volume percent $SO_2$ without significant modifications in the converter design to attain temperature control in the catalyst beds because of the smaller than normal gas velocities and the longer period of gas contact with the catalyst beds.

Because the conversion of $SO_2$ to $SO_3$ is about 97 percent efficient, the volume of gaseous emissions produced by acid plant 16 is small and easily disposed of. As mentioned before, the emissions may be recycled. Other options for emission treatment are either (1) adding the emissions to the unpurified gas entering the gas-slurry reactor 10, which is not detrimental to the slurry-reactor operation, or (2) adding them to the ferrous sulfate solution storage tank 32 to both free the gaseous emissions of $SO_2$ and reduce a chemically equivalent amount of ferric iron to ferrous iron while simultaneously producing sulfites that scavenge the small amounts of absorbed oxygen resulting from the contact of gaseous emissions with the ferrous sulfate solution.

As mentioned above, the sulfuric acid from the dual-contact three-pass sulfuric acid plant 16 is then reacted with iron either by way of cleaning steel in pickling vats 36 or by way of dissolving ferrous scrap wastes in unit 38 to produce an iron sulfate solution which is stored in tank 32 for the subsequent production of gas-slurry reactor reagent.

The fixed-ammonia still 13 is also made largely pollution free by the integrated system of the invention. Currently, coke oven gas leaves a coke oven 80 at about 700° C, and then passes to the gas collecting and initial cooling equipment 82 where all of the gas and vapors are cooled to about 80° C and some of the vapors condense. As described previously, the gas from the gas collecting and initial cooling equipment 82 enters the gas slurry reactor 10 from line 12 where the gas is scrubbed of $NH_3$, $H_2S$, HCN, and $(CN)_2$, and then passes through the primary cooler 42 where all of the gas is cooled to 58° C and some of the vapors condense. The gas then proceeds through the BTX absorber 50 to the pressurization equipment 52 before distribution as fuel gas. The flushing liquor and gas condensate coming from the gas collecting and initial cooling equipment 82 passes to a flushing liquor decanter 84. Part of the contents of decanter 84 pass to the fixed ammonia still 13. The majority of the contents of decanter 84 is recycled to the gas collecting and initial cooling equipment 82 along with the unrecycled portion of the contents of the primary gas cooler 42 as supplied from recirculation unit 46a. The major part of the contents of the primary gas cooler 42 is passed to the primary gas cooler liquor circulating unit cooler 46a and then back to the primary gas cooler 42 itself, as indicated.

The flushing liquor product of decanter 84 that goes to the fixed-ammonia still 13 principally comprises $NH_4Cl$ and smaller amounts of other fixed-ammonia compounds in solution along with some soluble tar acids, tar bases, neutral organic compounds, creosote-type naphthalene-saturated tars, and undissolved naphthalene. The tars, organic compounds, and naphthalene are extracted with solvents by an initial stage 13a before the flushing liquor decanter product passes to the fixed ammonia still 13b.

The waste solution from still 13b exceeds the volume of the still feed because of the approximate two-pounds-steam consumption per gallon of feed liquor processed, and contains water, unreacted lime, sand, limestone, fixed ammonia principally as chloride and thiocyanate, calcium chloride, calcium thiocyanate, and partially oxidized polymerized complex organic compounds. These wastes are concentrated in a spray-type evaporator without air pollution, using air indirectly heated by the partial cooling of decanter flushing liquor and auxiliary steam. Air and water vapor pass to the atmosphere. The product slurry is then mixed with one gallon of No. 2 fuel oil and emulsifier for every 11 gallons of slurry and is then sprayed into a preheated hearth-type incinerating retort 13d which is maintained at a 1,400° F minimum temperature by the passage of combustion products from externally burnt coke-oven gas burnt in the presence of controlled excess air. The hot gas products, free of entrained solids, comprise $Co_2$, $O_2$, $N_2$, $H_2O$, and small amounts of $SO_2$ and HCL, which are not troublesome so long as the total gaseous products are not cooled to their dewpoint. These gases proceed into the slurry reactor 10 via line 14.

I claim:
1. A continuous process removing impurities from coke oven gas, said process comprising:
   a. cooling the coke oven gas to a temperature in the approximate range of 78° C to 80° C and producing product $NH_3$ from the condensate;
   b. passing the cooled gas to a slurry reactor, together with waste gases produced during the production of said $NH_3$;
   c. using said reactor to scrub said coke oven gas using a slurry reagent comprising $Fe(OH)_2$ for reaction with the $HN_3$, $H_2S$, HCN, and $(CN)_2$ impurities contained in said gas;
   d. treating the scrubbed coke oven gas to remove residual impurities;
   e. separating the spent slurry reagent into product $(NH_4)_2SO_4$ solution and iron precipitates;
   f. oxidizing said iron precipitates to produce product iron oxides and product gases;
   g. feeding said product gases to a dual-contact acid plant to produce $H_2SO_4$ and waste gas;
   h. feeding said waste gas to said reactor;
   i. treating an Fe-containing substance with said $H_2SO_4$ to produce $FeSO_4$; and
   j. feeding said $FeSO_4$, together with said product $NH_3$ and externally available $NH_3$, to said reactor whereby the FeSO$_4$ and NH$_3$ react to form said slurry reagent.

2. A continuous process as claimed in claim 1 wherein said treating of said scrubbed coke oven gas comprises feeding said scrubbed coke oven gas to a primary gas cooler and a benzene, toluene, xylene absorber to remove residual impurities and pressurizing the gas with the impurities removed therefrom for distribution.

3. A continuous process as claimed in claim 1 wherein said Fe-containing compound comprises scrap iron waste and said H$_2$SO$_4$ is fed to a scrap iron waste dissolver.

4. A continuous process as claimed in claim 1 wherein said Fe-containing compound comprises steel and said H$_2$SO$_4$ is supplied to a pickling vat containing said steel.

5. A continuous process as claimed in claim 1 wherein said reactor comprises a single three-stage reactor and said spent reagents are fed from said reactor to a decanter to provide separation.

6. A continuous process as claimed in claim 5 wherein said product produced by said decanter is fed to a filter and the filtered iron precipitates are oxidized to produce said iron oxides and SiO$_2$.

7. A continuous process as claimed in claim 1 wherein said (NH$_4$)$_2$SO$_4$ solution produced during said separating step is passed to an evaporator to remove water therefrom and the evaporator treated (NH$_4$)$_2$SO$_4$ is fed to a cetrifuge to provide centrifuging thereof.

8. A continuous process as claimed in claim 7 wherein said product NH$_3$ is produced in an ammonia still and the mother liquor from said centrifuge is fed to said ammonia still to prevent impurity build-up.

9. A continuous process as claimed in claim 7 wherein the wet crystals produced during said centrifuging step are fed to a compactor-dryer to produce (NH$_4$)$_2$SO$_4$ flakes.

10. A continuous process as claimed in claim 9 wherein said flakes are cooled and stored so as to form additional interstitial crystals, thereby increasing crystal strength.

11. A continuous process as claimed in claim 1 wherein all additives fed to said reactor are fed at approximately the same temperature as the coke oven gas.

* * * * *

UNITED STATES PATENT AND TRADEMARK OFFICE
CERTIFICATE OF CORRECTION

PATENT NO. : 3,993,730
DATED : November 23, 1976
INVENTOR(S) : Franklin D. Cooper It is certified that error appears in the above-identified patent and that said Letters Patent are hereby corrected as shown below:

Column 2, line 29, change "and" to --an--; line 44, change "180" to --80--; line 53, change "passed" to --passes--.

Column 3, line 47, change "gasslurry" to --gas-slurry--.

Column 4, line 7, change "reacot" to --reactor--; line 63, change "insoluible" to --insoluble--.

Column 5, line 7, change "$(NH_4)$" to --$(NH_4)_4$--; line 8, change "gasslurry" to --gas-slurry--; line 13, change "slurryreactor" to --slurry reactor--; line 36, change "spend" to --spent--; line 36, cancel "liquid reagent" (second occurrence).

Column 6, line 18, change "1/12" to --1.12--.

Column 12, line 7, change "cetrifuge" to --centrifuge--.

Signed and Sealed this

Fifteenth Day of March 1977

[SEAL]

Attest:

RUTH C. MASON
Attesting Officer

C. MARSHALL DANN
Commissioner of Patents and Trademarks